United States Patent
Itan et al.

(10) Patent No.: US 10,346,967 B2
(45) Date of Patent: Jul. 9, 2019

(54) DETECTION OF STREAKS IN IMAGES

(71) Applicant: HP INDIGO B.V., Amstelveen (NL)

(72) Inventors: Liron Itan, Ness Ziona (IL); Oren Haik, Ness Ziona (IL); Avi Malki, Pethch Tikva (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/569,463

(22) PCT Filed: Jul. 31, 2015

(86) PCT No.: PCT/EP2015/001582
§ 371 (c)(1),
(2) Date: Oct. 26, 2017

(87) PCT Pub. No.: WO2017/020917
PCT Pub. Date: Feb. 9, 2017

(65) Prior Publication Data
US 2018/0089820 A1    Mar. 29, 2018

(51) Int. Cl.
| | |
|---|---|
| G06K 9/32 | (2006.01) |
| G06T 7/00 | (2017.01) |
| G06K 9/40 | (2006.01) |
| G06K 9/46 | (2006.01) |
| G06T 7/70 | (2017.01) |
| H04N 1/38 | (2006.01) |
| H04N 1/387 | (2006.01) |
| H04N 1/409 | (2006.01) |

(52) U.S. Cl.
CPC ......... *G06T 7/0004* (2013.01); *G06K 9/3275* (2013.01); *G06K 9/40* (2013.01); *G06K 9/4647* (2013.01); *G06T 7/70* (2017.01); *H04N 1/38* (2013.01); *G06T 2207/20024* (2013.01); *G06T 2207/20068* (2013.01); *G06T 2207/30144* (2013.01); *G06T 2207/30204* (2013.01); *H04N 1/3878* (2013.01); *H04N 1/409* (2013.01)

(58) Field of Classification Search
None
See application file for complete search history.

(56) References Cited

U.S. PATENT DOCUMENTS

| | | | |
|---|---|---|---|
| 5,001,766 A | 3/1991 | Baird | |
| 7,355,159 B2 | 4/2008 | Gann | |
| 7,359,093 B2 | 4/2008 | Schweid et al. | |
| 8,654,369 B2 | 2/2014 | Kogan et al. | |
| 10,051,153 B1 * | 8/2018 | Frank | H04N 1/4057 |

(Continued)

OTHER PUBLICATIONS

Aravind K. Mikkilineni et al: "Signature-embedding in printed documents for security and forensic applications", Proceedings SPIE; vol. 5306, Jun. 22, 2004; 12 pages, XP055261448.

(Continued)

*Primary Examiner* — Tahmina N Ansari
(74) *Attorney, Agent, or Firm* — HP Inc. Patent Department (57) ABSTRACT

Streaks in images are detected by determining a rotation angle of an image and calculating a rotated image based on a rotation of the image by the rotation angle. A cross-sectional pixel profile of the rotated image is determined and a peak in the cross-sectional pixel profile of the rotated image is determined. A streak in the image is identified based on the determined peak.

13 Claims, 9 Drawing Sheets

(56) References Cited

U.S. PATENT DOCUMENTS

| | | |
|---|---|---|
| 2005/0134623 A1 | 6/2005 | Mizes |
| 2007/0237399 A1 | 10/2007 | Satonaga |
| 2012/0274997 A1* | 11/2012 | Skinner ............... H04N 1/6036 358/504 |
| 2012/0288200 A1* | 11/2012 | Berkovich ......... H04N 1/00005 382/181 |
| 2014/0177016 A1 | 6/2014 | Wilsher |
| 2018/0089820 A1* | 3/2018 | Itan ..................... G06K 9/3275 |

OTHER PUBLICATIONS

Erkilinic M. Sezer et al: "Line and streak detection on polished and textured surfaces using line integrals"; Image Processing: Algorithms and Systems IX, 2011 8 pages vol. 7870 No. 1: XP060004703.
Hila Nachlieli et al., "Learning print artifact detectors learning print artifact detectors"; Jun. 28, 2012; 6 pages, XP055255132.
Onome Ugbeme et al., "Automated Algorithm for the Identification of Artifacts in Mottled and Noisy Images", (2007), Journal of electronic imaging, vol. 16 (No. 3) Accessed from http://scholarworks rit edu/article/1049.

\* cited by examiner

DETECTION OF STREAKS IN IMAGES

BRIEF DESCRIPTION OF THE DRAWINGS

Examples will be described, by way of example only, with reference to the accompanying drawings in which corresponding reference numerals indicate corresponding parts and in which.

DETAILED DESCRIPTION OF EMBODIMENTS

The description refers to identifying streaks in images. The invention provides streak detection by the following example embodiments. The following examples are to be understood with regard to methods, systems, printing presses and non-transitory machine-readable storage media for identifying streaks in images according to the invention.

An example method comprises determining a rotation angle of an image. A rotated image is calculated by rotating the image by the rotation angle. The example method further comprises determining a cross-sectional pixel profile (hereinafter also called "profile") of the rotated image and determining at least one peak in the cross-sectional pixel profile of the rotated image. At least one streak in the image is identified based on the at least one peak.

An example system comprises a computer and an image capture device. The computer includes at least one processor and a memory. The memory comprises executable instructions that when executed by the at least one processor cause the at least one processor to cause the image capture device to capture an image. The instructions, when executed by the at least one processor, further cause the at least one processor to determine a rotation angle of the image, calculate a rotated image by rotating the image according to the rotation angle, determine a pixel profile along a cross-section of the rotated image, determine a peak in the pixel profile, and identify a streak in the image based on the peak.

An example printing press comprises an image capture device. The printing press includes at least one processor and a memory. The memory comprises executable instructions that when executed by the at least one processor cause the at least one processor to cause the printing press to print a printout and to cause the image capture device to capture an image of the printout. The executable instructions, when executed by the at least one processor, further cause the at least one processor determine a rotation angle of the image, calculate a rotated image by a rotation of the image by the rotation angle, determine a cross-sectional pixel profile of the rotated image, determine a peak in the cross-sectional pixel profile of the rotated image, and identify a streak in the image based on the peak.

An example non-transitory machine-readable storage medium encoded with instructions executable by a processor comprises instructions to determine a rotation angle of an image, to calculate a rotated image by rotating the image according to the rotation angle, to determine a cross-sectional pixel profile of the image, to determine a peak in the cross-sectional pixel profile of the rotated image, and to identify a streak in the image based on the peak.

Streaks may appear as straight lines in the image. Some streaks may originate from a printing press, and are present in the printout from which the image is captured. Some streaks may originate from the capture device which has captured the image, e.g. due to debris on an image sensor of the capture device. In the following, y-direction specifies a processing direction of the printing press, e.g. a print medium feeding direction. For simpler presentation purpose, also the vertical direction of the rotated image is called y-direction. Thus, streaks caused by the printing press may run from the top to the bottom of the image.

Figure 10:
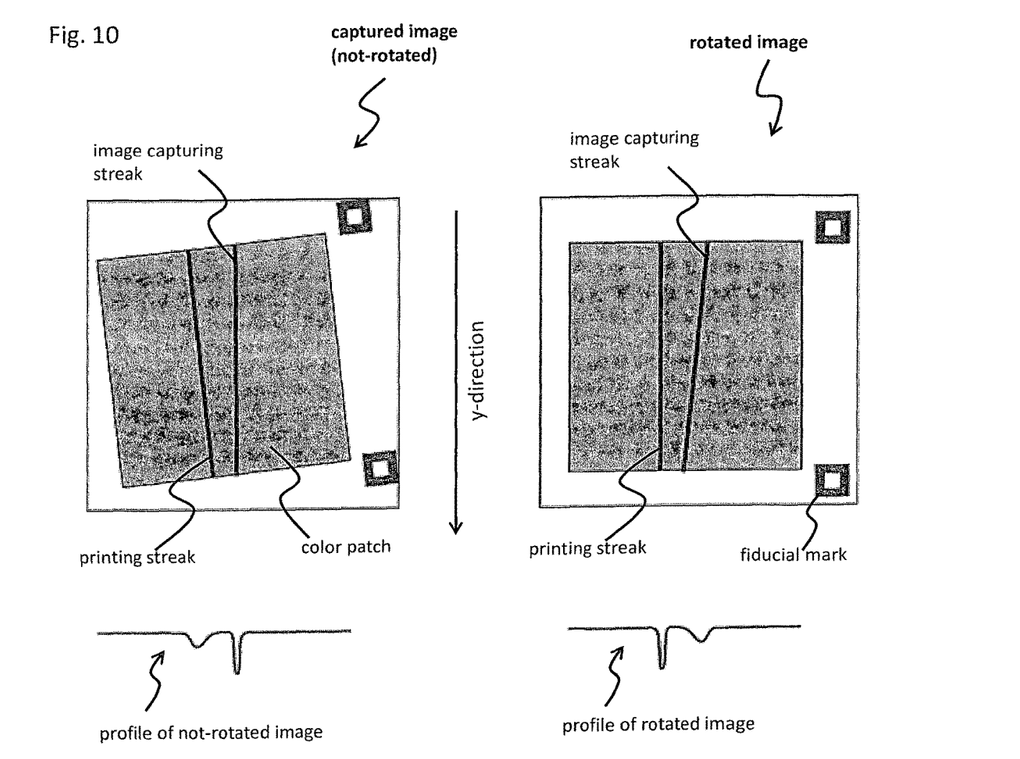
FIG. 10 shows an example captured image in a rotated and not-rotated stage and a schematic representations of corresponding cross-sectional pixel profiles.

As illustrated in FIG. 10, in general, images captured by a capture device show a rotation relative to the printout from which the image is captured, e.g. due to tolerances of a medium feeding mechanism of the capture device. In order to reduce or compensate for such rotations, the rotation angle of the image is determined and the image is rotated by the rotation angle (in a reverse direction). For example, a line, which is parallel to a print medium margin in a printout, appears at an angle in the (captured) image. By rotating the image by the determined rotating angle, the line will become parallel to the margin of the (rotated) image. In some examples, e.g. for reducing memory consumption, the image is replaced by the rotated image. In some other examples, a new instance of the image is generated for the rotated image.

The cross-sectional pixel profile of the rotated image correlates to a cross-section through the rotated image. In some embodiments, the profile corresponds to a cross-section in a direction perpendicular to the y-direction, e.g. a horizontal cross-section of the image. The profile is associated with pixel values of the image along the direction of the cross-section. (Non-horizontal) streaks in the image will appear as peaks in the profile. For example, a bright streak, i.e. a streak of pixels comprising brighter pixels than its environment in the image may appear as an upward peak and, correspondingly, a dark streak (comprising darker pixels than its environment in the image) may appear as a downward peak in the profile. This enables to identify streaks in the image based on peaks determined in the profile.

In some examples, the profile is a one-dimensional vector. The vector may have a number of vector components that corresponds to the number of pixels of the rotated image along the cross-section of the profile. For example, the profile vector is determined by a single horizontal line of pixels of the rotated image. The signal-noise-ratio of the profile may be increased in that in some examples the profile, e.g. the vector of the profile, is determined by projecting pixels of the rotated image to the one-dimensional vector. For example, projecting the pixels of the rotated image may include averaging the pixels of the rotated image along the y-direction.

In some examples, detecting a peak in the cross-sectional pixel profile includes calculating, for each element (e.g. vector component) of the pixel profile, a local mean and a local standard deviation within a local window around the element, and identifying an element as peak in response to a difference between a value of the element and the local mean exceeding a threshold. For example, a bright streak may be identified in response to a value of the profile vector component exceeding the local mean by more than twice the standard deviation. A dark streak may be identified in response to a value of the profile vector component goes below the local mean by more than twice the standard deviation.

In some examples, detecting the peak in the cross-sectional pixel profile is performed in at least two scales. For example, calculating (for each element of the pixel profile a local mean and a local standard deviation within a local window around the element) and identifying (an element as peak in response to a difference between a value of the element and the local mean exceeding a threshold) is repeated in at least two scales. For example, the at least two scales differ with regard to the size of the local windows and/or in kernel size of an applied filter. This increases streak detection rate, since some peaks may be determined in one of the at least two scales but not in another one of the at least two scales. However, this may also result in artifacts due to multiple detection of a streak in different scales (in not exact the same spatial location). Therefore, some examples further include merging streak detection. For example, merging streak detection includes (a) sorting the spatial location of the detected streaks in order to determine a sorted list of detected streaks, and (b) merging adjacent streaks of the sorted list if a distance between them is smaller than a certain threshold.

In some examples, identifying a streak is based on a respective strength of corresponding peaks in different profiles, namely on a strength of a (first) peak in the profile of the rotated image and a strength of a corresponding (second) peak in a (corresponding) profile of the (not-rotated) image. In other words, identifying a streak is based on (at least) two peaks, wherein a first peak is associated with the rotated image and a second peak is associated with the (not-rotated) image. This is based on the insight that a streak corresponds to a stronger peak in the profile if the streak runs essentially perpendicular to the direction of the cross-section than if the streak runs under an angle with regard to the direction of the cross-section. Therefore, by rotating the image, the strength of peaks which correspond to streaks may change, as schematically illustrated in FIG. 10. This may increase a detection rate of detecting streaks in the image, as peaks in the profile caused by streaks may be better distinguished from other peaks in the profile by determining the change in peak strength in response to rotating the image.

Therefore, some examples further include determining a cross-sectional pixel profile of the (not-rotated) image. Both profiles, i.e. the profile of the rotated image and the profile of the not-rotated image, may be determined in an identical manner except for the fact that they are determined for different images, namely for the rotated and for the not-rotated image. Accordingly, the disclosed implementations with regard to the profile of the rotated image are also to be understood with regard to the profile of the not-rotated image in some examples. In some examples, the profile of the not-rotated image is determined prior to rotating the image. This enables that rotating the image may overwrite the (not-rotated) image in some examples. The strength of a peak can be determined as a maximum peak height, a peak amplitude and/or by integrating over the peak, for example. When calculating the strength of a peak, a baseline (of the profile in the vicinity of the peak) may be considered in order to compensate for the brightness of the image in the environment of the streak.

Streaks in the image may be caused by the image capture device (image capturing streaks). It might be desirable to distinguish image capturing streaks from other streaks, e.g. from streaks caused by the printing press. Therefore, in some examples, identifying a streak includes identifying, e.g. by an image capturing streak detector of the system and/or of the printing press, the streak as an image capturing streak. A streak may be identified as an image capturing streak in response to the strength of a peak in the profile of the rotated image being smaller than the strength of a corresponding peak in the profile of the (not-rotated) image. As described before, peaks which correspond to streaks may change their strength when rotating the image. Image capturing streaks are caused by debris on the image capture device or by defect pixels of an optical sensor of the image capture device, for example. Since debris and also defect pixels are considered to remain on the same position during capturing the image, streaks caused by the image capture device may appear as straight line in the image which is parallel to the processing direction of the image capture device and also parallel to the y-direction of the not-rotated image. However, in the rotated image such streaks appear at an angle with regard to the y-direction of the rotated image. Therefore, the strength of the corresponding peak in the profile of the rotated image will be smaller than the strength of the peak in the profile of the not-rotated image.

Some examples include signaling a maintenance requirement for the image capture device in response to identifying more than a certain threshold number of image capturing streaks. This may indicate an operator of the image capture device to clean the capture device or to replace some defect parts of the capture device. For example, the maintenance requirement is signaled if at least one, at least two, at least five or at least ten image capturing streaks are identified within the same captured image. The maintenance requirement may be signaled by a visual or audible alert and/or by a message to the operator, e.g. as a message on a computer or a mobile device. A signal to pause operation may be sent to the image capture device in order to prevent from capturing further images with disturbances.

Streaks in the image may originate from the printout from which the image was captured. Such streaks may be caused by the printing press (image printing streak). It might be desirable to distinguish image printing streak from other streaks, e.g. from image capturing streaks. Therefore, in some examples, identifying a streak includes identifying, e.g. by a printing streak detector of the system and/or of the printing press, the streak as an image printing streak. A streak may be identified as an image printing streak in response to the strength of a peak in the profile of the rotated image being larger than the strength of a corresponding peak in the profile of the (not-rotated) image. As described before, peaks which correspond to streaks may change their strength when rotating the image. Image printing streaks are caused by mechanical scratches or damage on a wiper that cleans a blanket, for example. Since such streaks are parallel to the processing direction, they appear as straight line at an angle in the image. However, by rotating the image according to the determined rotation angle, such streaks become parallel to the y-direction of the rotated image. Therefore, the strength of the corresponding peak in the profile of the rotated image will be larger than the strength of the peak in the profile of the not-rotated image.

Some examples include signaling a maintenance requirement for the printing press in response to identifying more than a certain threshold number of image printing streaks. This may indicate an operator of the printing press to clean the printing press or to replace some defect parts of the printing press. For example, the maintenance requirement is signaled if at least one, at least two, at least five or at least ten image printing streaks are identified within the same image. The maintenance requirement may be signaled by a visual or audible alert and/or by a message to the operator, e.g. as a message on a computer or a mobile device. A signal to pause operation may be sent to the printing press in order to prevent from printing further printouts with unwanted streaks.

Identifying image capturing streaks and/or image printing streaks enables to reduce false replacement of expensive parts of the image capture device and/or the printing press. Also troubleshooting time can be reduced.

The effect of rotating the image on the strength of peaks described before is illustrated in FIG. 10, which shows a captured (not-rotated) image on the left and a corresponding rotated image on the right. In the captured image two streaks are visible, a printing streak originating from the printing press and an image capturing streak originating from the capture device. The printing streak may be caused by a scratch of the printing press and, thus, already present in the printout. The image capturing streak may be caused by dust on the capture device and, thus, only visible in the captured image but not in the printout. Since dust particles do not change their position while capturing the image, the resulting image capturing streak is a vertical line in the captured image, i.e. parallel to the y-direction. The printing streak is parallel to the processing direction of the printing press. Since the capture device has some tolerances of its paper feed mechanism, the printout appears under an angle in the captured image. Thus, the printing streak also appears under the angle with regard to the y-direction. This angle, i.e. the rotation angle, may be determined by analyzing the location of fiducial marks, which are also printed on the print out and, therefore, present in the captured image. By rotating the captured image by the determined rotating angle, the printing streak becomes parallel to the y-direction as illustrated on the right side in FIG. 10. Accordingly, the formerly parallel image capturing streak now appears under an angle in the rotated image.

FIG. 10 further illustrates a schematic (simplified for purpose of illustration) example cross-sectional pixel profiles of the not-rotated image and the rotated image. Streaks which are parallel to the y-direction appear as sharp, narrow peaks with an amplitude that is larger than the amplitude of (broader) peaks that correspond to streaks under an angle to the y-direction. In some examples, the strength of a peak corresponds to the amplitude of the peak. Peak characteristics changes by rotating the image by the rotating angle: peaks correlated with printing streaks become narrower and increase their amplitude, whereas peaks correlated with image capturing streaks become broader and decrease their amplitude when rotating the image by the rotation angle. This enables to differentiate between these types of streaks.

Figure 11:
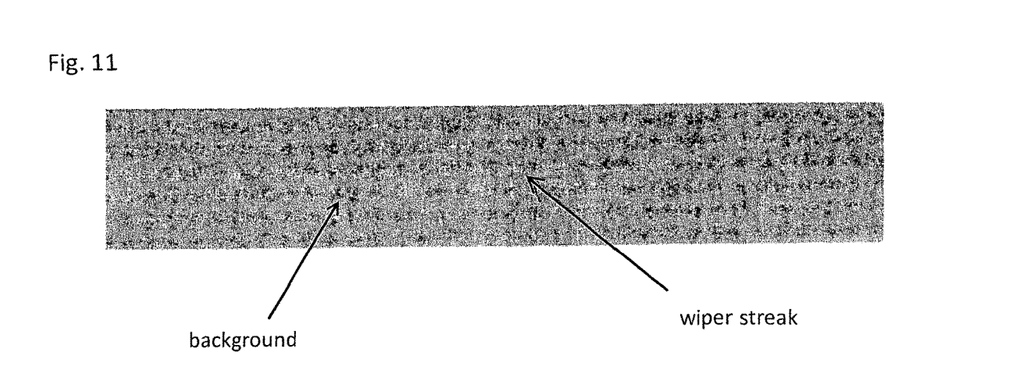
FIG. 11 shows an example appearance of a wiper streak in a captured image.

Now turning back to further examples. Printing presses can cause streaks of different widths and shapes. For example, streaks caused by a damage of a wiper are generally broader than streaks caused by mechanical scratches. In general, a wiper streak may appear as a wider streak in the image than streaks caused by mechanical scratches. As illustrated in FIG. 11, wiper streaks may have smooth edges and a darker middle area which may not differ significantly from the background (meaning they have texture-like pattern perpendicular to the y-direction). It might be desirable to distinguish wiper streaks from other printing streaks. Therefore, in some examples, identifying a streak in the image includes identifying, e.g. by a wiper streak detector of the system and/or of the printing press, the streak as a wiper streak. In some examples, identifying a wiper streak includes applying a local spatial standard deviation on the profile. For example, a new profile is calculated in that a (new) one-dimensional vector is determined by calculating for each each element (i.e. vector component) of the pixel profile, a local standard deviation within a local window around the element. Therefore, wiper streaks may be identified as disclosed herein with regard to (regular) printing streaks but based on the new profile obtained from the cross-sectional pixel profile by applying the local standard deviation operation as described before.

Some examples include signaling a maintenance requirement for the printing press in response to identifying more than a certain threshold number of wiper streaks. This may indicate an operator of the printing press to clean or replace a wiper of the printing press. For example, the maintenance requirement is signaled if at least one, at least two, at least five or at least ten wiper streaks are identified within the same image. The maintenance requirement may be signaled by a visual or audible alert and/or by a message to the operator, e.g. as a message on a computer or a mobile device. A signal to pause operation may be sent to the printing press in order to prevent from printing further printouts with unwanted streaks.

In some examples, a peak (in the profile of the rotated and/or the not-rotated image) is identified as an image capturing streak in response to the strength of the peak in the cross-sectional pixel profile of the rotated image being smaller than the strength of the peak in the cross-sectional pixel profile of the image; otherwise it is detected as printing streak. This may simplify streak detection, as each peak may be identified as image printing peak per default if not detected as image capturing streak.

Some examples include broadening streaks by applying a morphological filter. The morphological filter may be applied to the rotated and/or to the not-rotated image. The morphological filter may include a dilate operator, e.g. for enhancing (broadening) darker streaks, and/or a erode operator, e.g. for enhancing (broadening) brighter streaks. The dilate operator and the erode operator may be based on a 1D line kernel along a direction perpendicular to the y-direction, i.e. vertical to the streaks to be broadened.

In some examples, the rotation angle has a maximum absolute value of (e.g. it is limited to) 30°, 20°, 10°, 5° or 3°. The rotation angle may be less than 90°, because it corresponds to an angle of the streaks relative to a processing direction when printing the printout and/or capturing the printout. Some examples include additionally rotating the image by 90° or 180° in order to achieve a desired page orientation, e.g. a portrait or landscape orientation of the image.

Some examples include determining the rotation angle based on analyzing at least two or at least four fiducial marks included in the image. Fiducial marks are artificial patterns that are different from the data in the image, e.g. in terms of grey level, color and/or structure. The location of fiducial marks may be determined by a correlation method, e.g. by template matching. The fiducial marks may be included in a print job of the printing press. The fiducial marks may be printed on the printout together with a test print for detecting streaks. In some examples, the captured image is geometrically transformed so that it can be registered or aligned with a reference digital image defined by the print job, as the exact location of fiducial marks according to the print job is known a-priori. The fiducial marks may also be printed on regular production printouts in a normal utilization of the printing press. Therefore, in some examples the print job includes the fiducial marks in addition to at least a test image for detecting streaks and/or a regular production image. In some examples, at least two fiducial marks are located along the processing direction (y-direction) of the printing press.

Some examples include capturing the image by the capture device. In some examples, the image is captured from a printout printed by a printing press. Some examples include printing the printout by a printing press. It should be noted that, accordingly, some further examples do not include printing the printout and/or some examples do not include capturing the image. For example, the printout may be printed elsewhere and/or the image may be captured from the printout elsewhere. Therefore, some examples include receiving a digital (not-rotated) image (representing a captured printout). The image may be received electronically, e.g. via a computer network, e-mail, Internet download, or file transfer; or physically by receiving a data carrier, e.g. a disc, CD or DVD, memory stick or memory card, which may be connected to the computer.

Some examples may include creating a print job for the printing press. The print job includes at least one test image to generate a printout for detecting streaks. For example, a test image may include at least one homogeneous color patch. In some examples, at least one color patch covers the whole printable width and/or length of a page of the printout on a print medium. In some examples, the printout or also the at least one color patch cover a maximum printable width of the printing press. For example, the print job includes two ink coverages (e.g. 20% and 80%) at each fundamental color (e.g. cyan, magenta, yellow and black), wherein each may be represented by a separate color patch. The print job may further include one or more of color wedges, crop marks and register crosses.

The image capture device may be a stand-alone scanner. In order to identifying streaks in an ongoing operation of the printing press, in some examples, the image capture device is an inline-scanner integrated in the printing press. This enables to automatically detect streaks in printouts without any need for manual operations.

The capture device may capture the images at resolution of at least 100, 200, 300, 600 or 1200 dots per inch (dpi). On the one hand, a higher scan resolution improves detecting thinner streaks. On the other hand, a lower resolution requires less computational power for performing the streak detection. In some examples, each page of a printout is captured as a separate image. In some examples, the image is captured in RGB color space. Some examples include converting the image to a luminance image, i.e. an image that has only a luminance channel but no further color channels.

Figure 1:
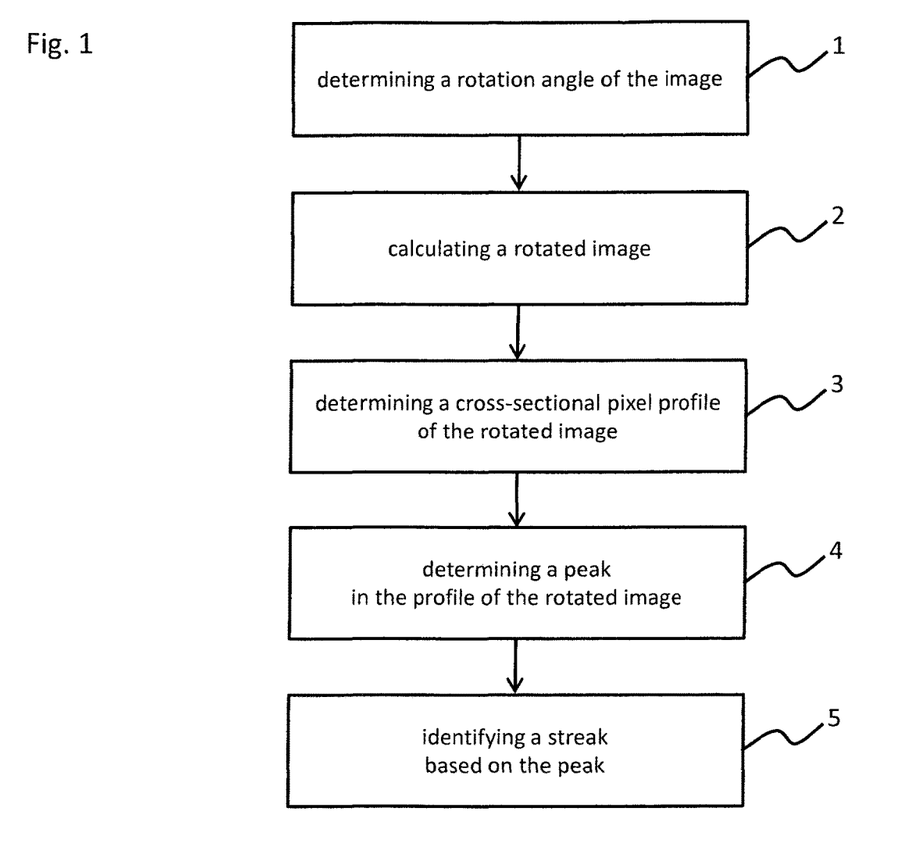
FIG. 1 shows a block diagram of an example method for identifying a streak in an image.

Now referring to FIG. 1, which illustrates an example method of identifying (one or more) streaks in an image. The example method includes determining, in block 1, a rotation angle of an image and calculating, in block 2, a rotated image based on a rotation of the image by the rotation angle. By rotating the image, the image may be overwritten or a new rotated image may be generated in addition to the (not-rotated) image. The example method further includes determining, in block 3, a cross-sectional pixel profile of the rotated image. The profile may represent a cross-section (substantially) vertical to the direction of the streaks in the image, e.g. vertical to the y-direction of the image. For example, the cross-section is a horizontal cross-section through the image. The example method further includes determining, in block 4, a peak in the cross-sectional pixel profile of the rotated image. For example, all peaks in the profile are determined. At least one streak is identified, in block 5, based on the determined peak(s). However, some peaks may not correspond to streaks, but rather to image features, for example. Therefore, the number of the determined peaks may be higher than the number of identified streaks.

Figure 2:
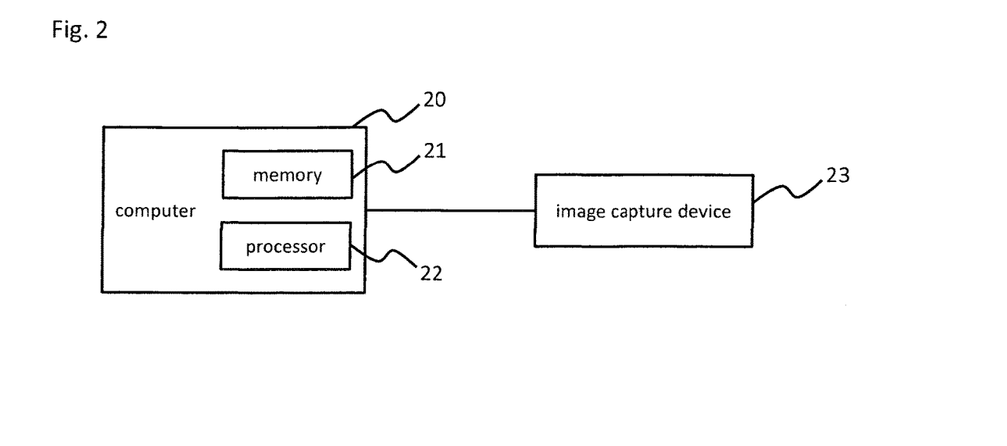
FIG. 2 is an illustration of a system with a computer and an image capture device.

An example system comprising a computer 20 and an image capture device 23 is illustrated in FIG. 2. The computer includes at least one processor 22 and a memory 21. The memory 21 comprises executable instructions that when executed by the at least one processor 22 cause the at least one processor 22 to cause the image capture device 23 to capture the image. The instructions further cause the processor to determine a rotation angle of the image; to calculate a rotated image by rotating the image according to the rotation angle; to determine a pixel profile along a cross-section of the rotated image; to determine a peak in the pixel profile; and to identify a streak in the image based on the peak. In some further example systems, the instructions further cause the processor to perform one or more example methods described before arid hereinafter.

Figure 3:
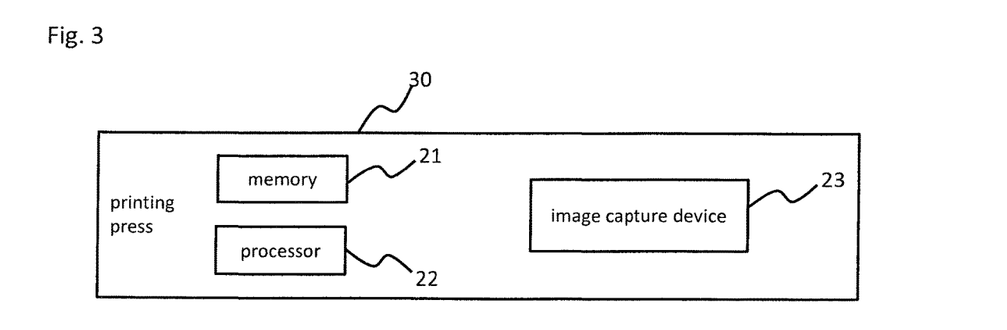
FIG. 3 is an illustration of a printing press with an image capture device for detecting streaks in printouts.

An example printing press including at least one processor 22 and a memory 21 is illustrated in FIG. 3. The memory 21 comprises executable instructions that when executed by the at least one processor 22 cause the at least one processor 22 to cause the printing press to generate the printout and cause the image capture device 23 to capture the image. The image capture device 23 may be an inline-scanner which is arranged in line with a print processing path of the printing press. In some examples, a printout generated by the printing press 30 is automatically feed into the capture device 23 in order to automatically acquire the image for detecting streaks caused by the printing press 30. The instructions further cause the processor to determine a rotation angle of the image; to calculate a rotated image by rotating the image according to the rotation angle; to determine a pixel profile along a cross-section of the rotated image; to determine a peak in the pixel profile; and to identify a streak in the image based on the peak. In some further example systems, the instructions further cause the processor to perform one or more example methods described before and hereinafter.

Figure 4:
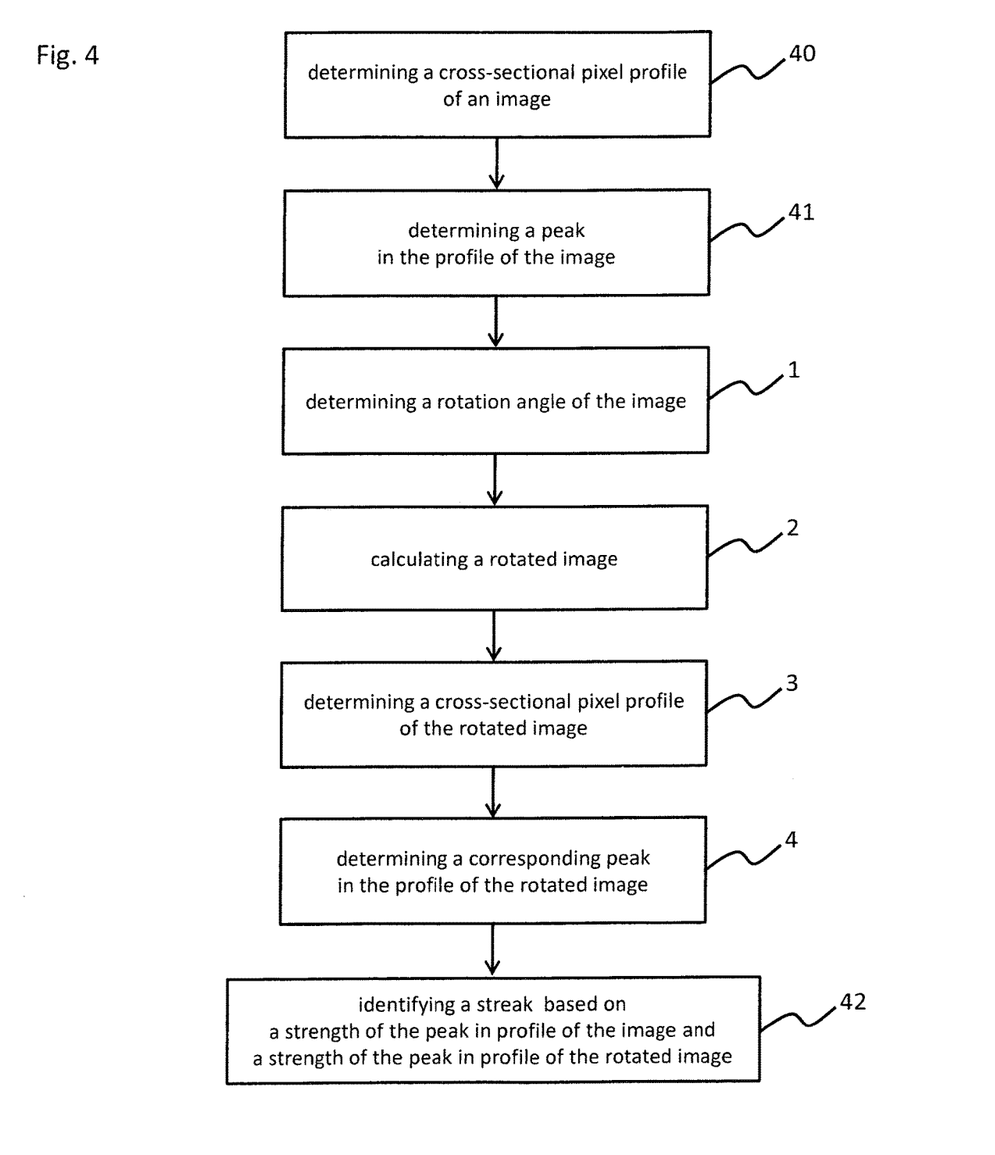
FIGS. 4-9 show block diagrams of still further example methods for identifying a streak in an image.

Now referring to FIG. 4, which illustrates an example method of detecting streaks in an image based on analyzing strengths of corresponding peaks determined for the rotated and not-rotated image. The example method includes determining, in block 40, a cross-sectional pixel profile of the (not-rotated) image and determining, in block 41, a peak in the cross-sectional pixel profile of the not-rotated image. As illustrated in FIG. 4, this may be performed prior to determining, in block 1, a rotation angle of an image, calculating, in block 2, a rotated image rotated by the rotation angle, determining, in block 3, a cross-sectional pixel profile of the rotated image, and determining, in block 4, a peak in the cross-sectional pixel profile of the rotated image. The cross-sectional pixel profile of the rotated image may correspond to the cross-sectional pixel profile of the not-rotated image, e.g. with regard to the direction of the cross-section and/or a scale and/or a number of elements of the profiles. The Peak determined in the cross-sectional pixel profile of the rotated image may correspond to the peak determined in the cross-sectional pixel profile of the not-rotated image. Corresponding peaks may be peaks at corresponding locations within the profiles (and also at corresponding locations along the cross-sections of the images), because a certain streak causes a peak in the profile of the rotated image and also in the profile of the not-rotated image.

In some further example methods, the actions described with regard to blocks 1 through 4 may be performed prior to the actions described with regard to blocks 40 and 41. In some examples, prior to determining the cross-sectional pixel profile of the not-rotated image in block 40, a morphological filter is applied to the (not-rotated) captured image which broadens streaks. Additionally or alternatively, in some examples, a morphological filter is applied to the rotated image which broadens streaks.

Now referring back to FIG. 4, the example method further includes identifying, in block 41, streaks based on a strength of the (determined) peak in the profile of the (not-rotated) image and a strength of the (determined) peak in profile of the rotated image. As described before, the strength of corresponding peaks can differ due to the rotation (at least if the peak is caused by a streak). This effect is used to identify streaks, as described before.

Figure 5:
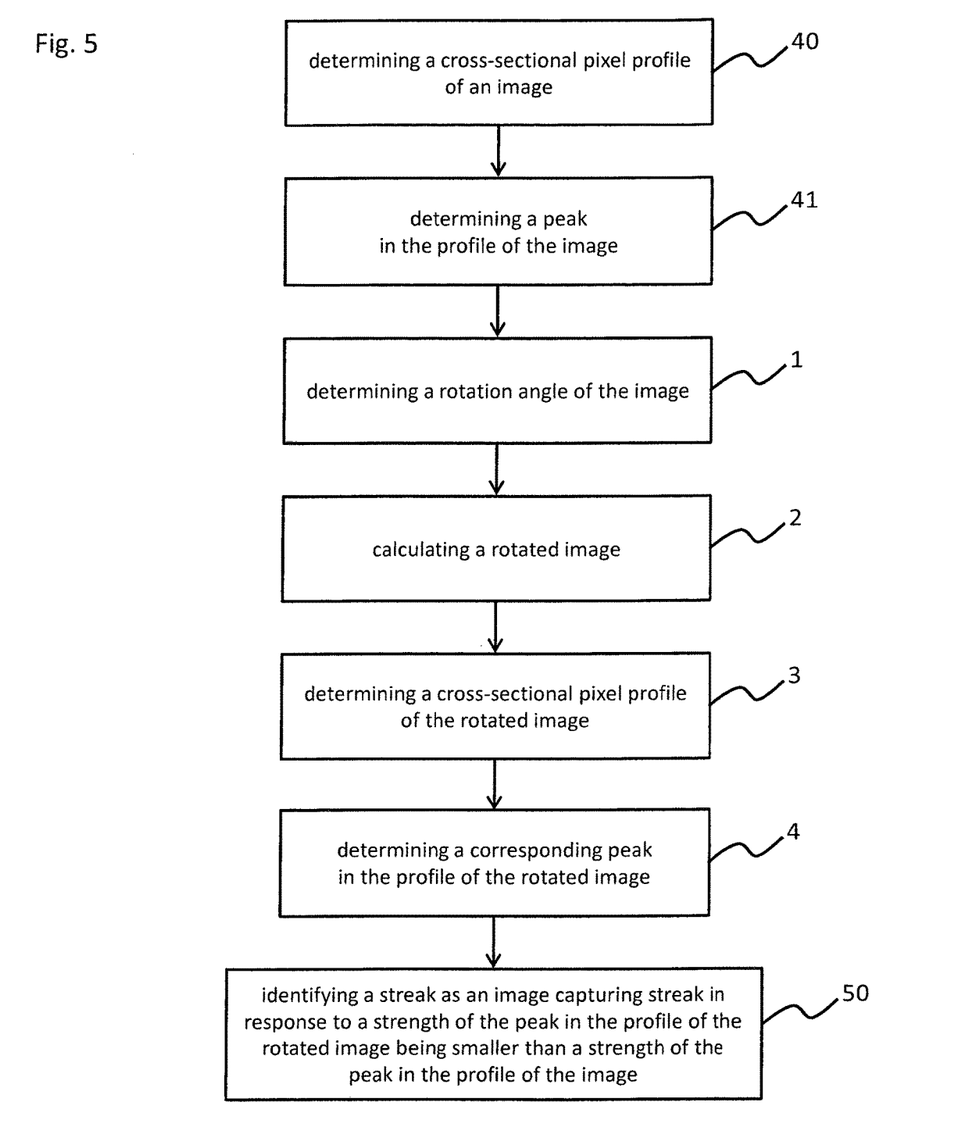

The example method illustrated in FIG. 5 may be performed by an image capturing streak detector. The example method is based on the example method described with regard to FIG. 4. In addition to the example method according to FIG. 4, the example method illustrated in FIG. 5 further includes identifying, in block 50, a streak as an image capturing streak in response to the strength of the peak in the cross-sectional pixel profile of the rotated image being smaller than the strength of the peak in the cross-sectional pixel profile of the image. This allows for distinguishing streaks caused by the image capture device from other peaks, e.g. from peaks caused by the printing press.

Figure 6:
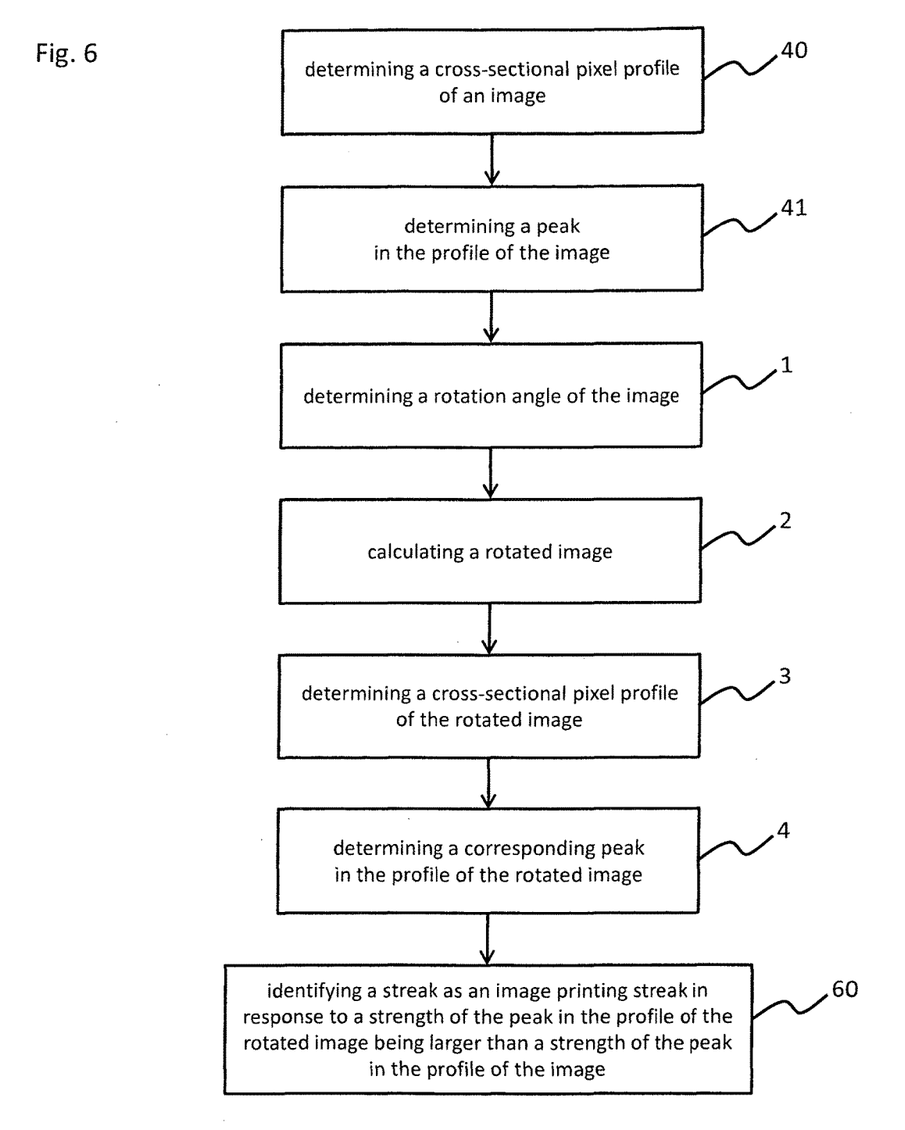

The example method illustrated in FIG. 6 may be performed by a printing streak detector. The example method is based on the example method described with regard to FIG. 4. In addition thereto, the example method illustrated in FIG. 6 further includes identifying, in block 60, a streak as an image printing streak in response to the strength of the peak in the cross-sectional pixel profile of the rotated image being larger than the strength of the peak in the cross-sectional pixel profile of the image. This allows for distinguishing streaks caused by the printing press from other peaks, e.g. from peaks caused by the image capture device.

Figure 7:
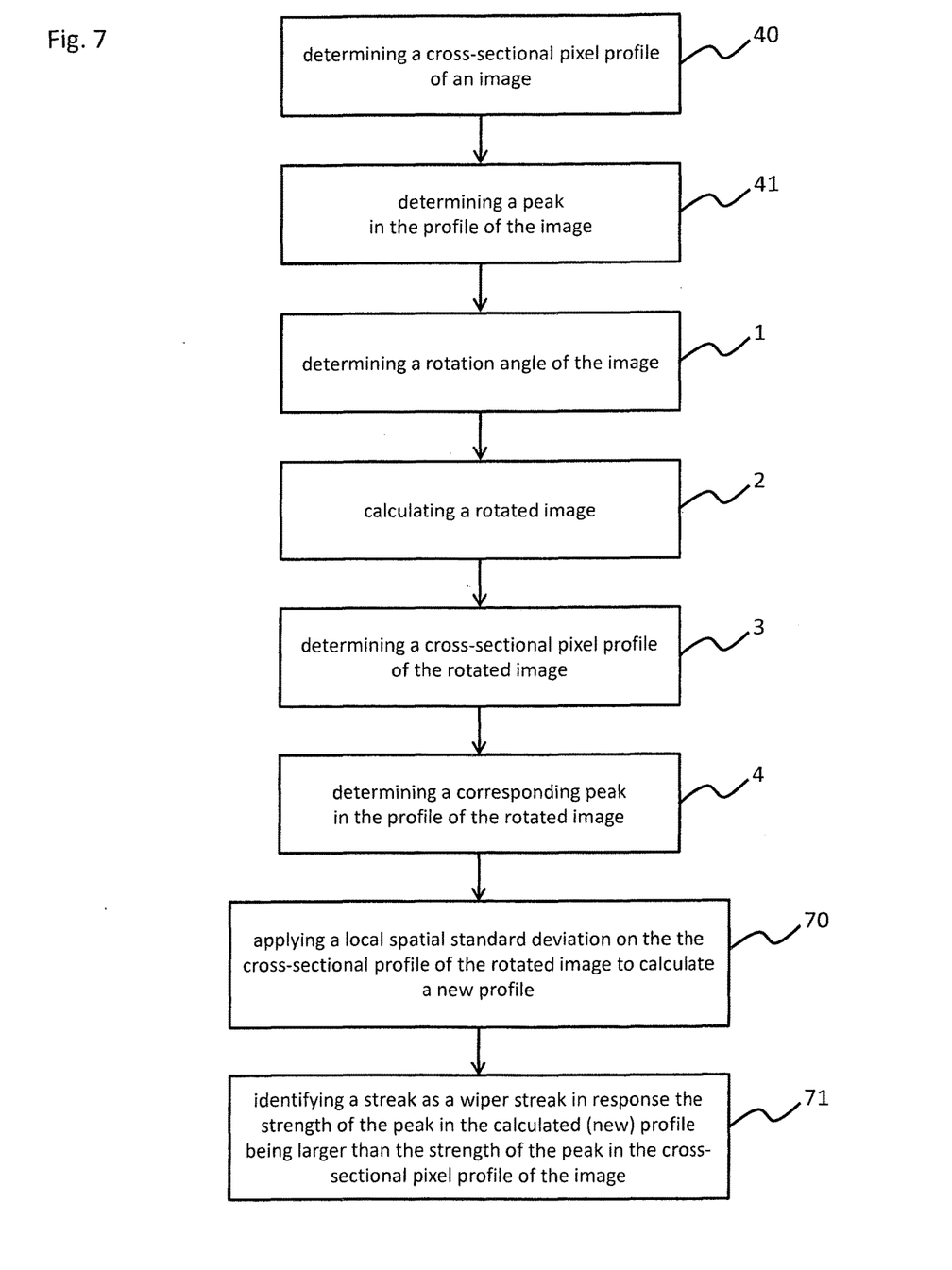

Streaks originating from the printing press may be distinguished from other peaks as described before. The example method illustrated in FIG. 7 further allows for distinguishing different types of streaks caused by the printing press. For example, a streak may be caused by a mechanical scratch in the printing press or by a defect of a wiper of the printing press. The example method illustrated in FIG. 7 is based on the example method described with regard to FIG. 4 and may be performed by a printing streak detector. The example method further includes applying, in block 70, a local spatial standard deviation on the the cross-sectional profile of the rotated image to calculate a new profile. Based on this calculated (new) profile, the example method illustrated in FIG. 7 further includes identifying, in block 71, the streak as a wiper streak in response the strength of the peak in the calculated (new) profile being larger than the strength of the peak in the cross-sectional pixel profile of the image. Thereby, wiper streaks can be identified which originate from wiper defects usually causing broader streaks than mechanical scratches.

Figure 8:
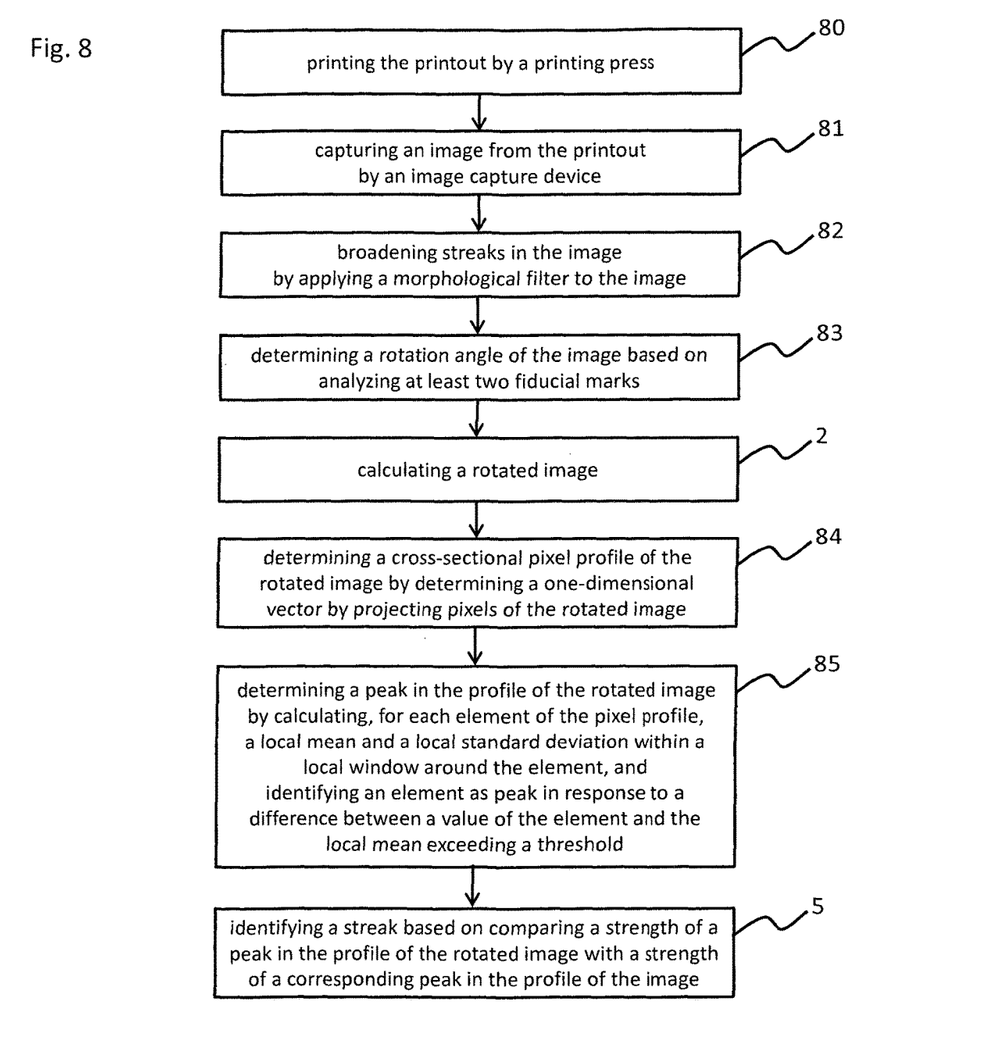

Now referring to FIG. 8, which illustrates a still further example method of detecting streaks in an image. This example method includes printing, in block 80, a printout by a printing press and capturing, in block 81, the image from the printout by an image capture device. In block 82, a morphological filter is applied to the captured image which broadens streaks. This may be considered as an (image-) preprocessing prior to determining the pixel profile. The example method further includes determining, in block 83, a rotation angle of the image. The rotation angle may have a maximum (absolute) value of 5°, 10°, 15°, 20° or 30°. The rotation angle is determined based on analyzing at least two fiducial marks (on the printout). It may also be based on at least four fiducial marks. In block 2, a rotated image is generated by rotating the captured image by the determined rotation angle. Due to this rotation streaks along a processing direction of the printout run parallel to the y-direction (and also parallel the vertical margin) in the rotated image, and, thus, also run parallel to (vertical) pixel columns of the rotated image. The example method further includes determining, in block 84, a cross-sectional pixel profile of the rotated image by determining a one-dimensional vector by projecting pixels of the rotated image along the y-direction. The projection may include averaging along the y-direction. Since the rotated image is so rotated that streaks caused by the printing press run along the y-direction in the rotated image, peaks which corresponds to such streaks may appear relatively strong in the profile, whereas a similar streak (e.g. streaks with similar width, shape, texture, color and/or contrast) under an oblique angle would result in less stronger peaks. The example method further includes detecting the peaks in the profile. Therefore, the method includes calculating, in block 85, for each element of the pixel profile, a local mean and a local standard deviation within a local window around the element, and identifying an element as peak in response to a difference between a value of the element and the local mean exceeding a certain threshold. As described before, the profile may be a one-dimensional vector, and the elements may be vector components of the one-dimensional vector. The method further includes identifying, in block 5, at least one streak based on comparing a strength of a peak in the profile of the rotated image with a strength of a corresponding peak in the profile of the image, e.g. according to any example method described before or hereinafter.

In some examples, the detection of streaks causes a maintenance indication with regard to the printing press and/or the image capture device or a signal to halt operation of the printing press and/or image capture device. Therefore, in some examples, identification of (further) streaks may be inhibited in response to a certain threshold number of streaks having been identified in the image. For example, as soon as one, two, five, or ten streaks are identified in a single image, identifying further streaks in this image may be inhibited.

Figure 9:
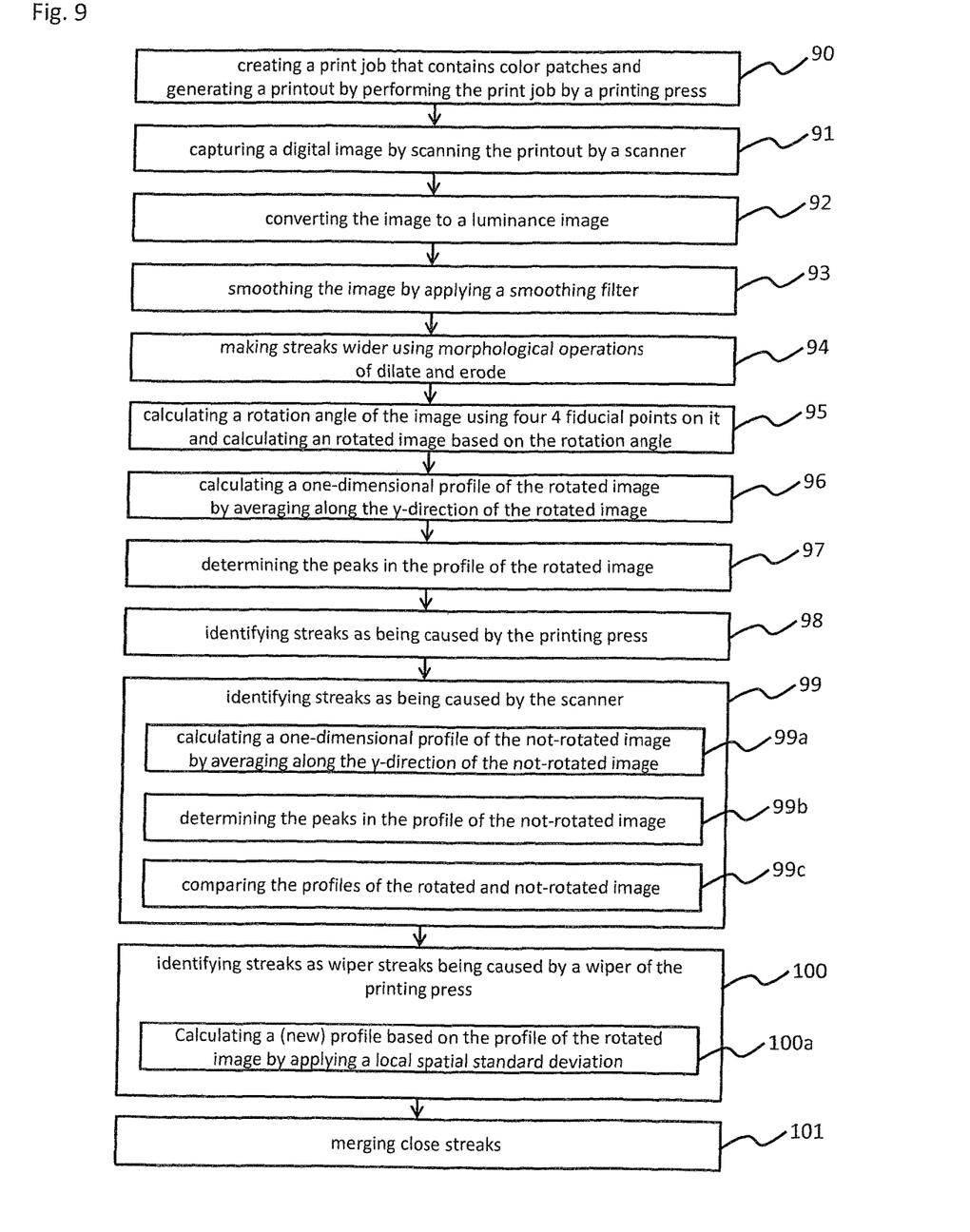

Now referring to FIG. 9, which illustrates a still further example method of detecting streaks in an image. The example method includes creating, in block 90, a print job that contains color patches, e.g. with two ink coverages, for example 20% and 80%, at each fundamental printing ink, e.g. cyan, magenta, yellow and black. This print job is printed, in block 90, with a printing press to generate a printout, which, for example, includes at least eight color patches of 20% cyan, 20% magenta, 20% yellow, 20% black, 80% cyan, 80% magenta, 80% yellow, and 80% black. The example method further includes scanning, in block 91, the printout, e.g. at a resolution of at least 300 dots per inch (dpi), to acquire a digital image, e.g. in RGB color space, of the printout.

In block 92, the image is converted to a luminance image. Thus, the image now includes a luminance channel and lacks any color information. The method further includes smoothing, in block 93, the image by applying a smoothing filter, e.g. by convolving the image with a small 1D rectangular filter (in y-direction) for graininess reduction. As illustrated by block 93, the method further includes making streaks wider, e.g. by applying a morphological operation of dilate (bright streaks) and/or a morphological operation of erode (dark streaks). In some examples, the morphological operation(s) is/are based on one-dimensional line kernel(s) along an x-direction (which is vertical to the y-direction and also vertical to the streaks direction).

The method further includes calculating, in block 95, a rotation angle of the image using four 4 fiducial points on it and rotating, in block 96, the image according to the calculated rotation angle. This makes the streaks parallel to the y-direction in the rotated image.

Some example methods further include making streaks wider in the rotated image, e.g. by applying a morphological operation of dilate (bright streaks) and/or a morphological operation of erode (dark streaks) on the rotated image.

Now turning back to the example method illustrated in FIG. 9, the method further includes calculating, in block 96, a profile along the y-direction by averaging (pixels of the rotated image) along the y-direction, and thereby generating a 1D vector as profile.

The method further includes locating, in block 97, the peaks in the 1D vector by: (a) Calculating for each location in the vector (i.e. for each vector component) a local mean and local standard deviation (STD) within a local window around it, and (b) repeating (a) in at least two scales. The at least two scales may correspond to at least two different widths of the local window and/or at least two different kernel sizes and/or by scanning the image with different resolutions, scaling the image prior to determining the profile, performing the projection, e.g. the averaging, over at least two adjacent pixel columns along the y-direction (for example, each vector component may be calculated by averaging a (n×m)-sub-image of the image, wherein n>1 and 1≤m≤image height) and/or reducing the number of vector components of the 1D vector of the profile. (c) Determining a location, i.e. vector component, as a peak if the following condition is satisfied for at least one scale: value of vector component>local mean+2*local STD for bright streaks and value of vector component<Local mean−2*local STD for dark streaks.

The example method further includes identifying, in block 98, streaks as being caused by the printing press by: (d) Calculating a profile and locating peaks of the profile with regard to the not-rotated image in the same manner as described before with regard to the rotated image. (e) Identifying a streak as being caused by the printing press (e.g. by mechanical scratches) if the corresponding peak at the same spatial location in the not-rotated image has a lower strength, e.g. lower amplitude, than in the rotated image. In some examples, (d) and (e) are performed by a printing streak detector, i.e. a detector for identifying image printing streaks by performing (d) and (e).

The example method further includes identifying, in block 99, streaks as being caused by the scanner by: (f) Calculating, in block 99*a*, a cross-sectional pixel profile and locating, in block 99*b*, peaks of the profile with regard to the not-rotated image in the same manner as described before with regard to the rotated image. (g) Identifying a streak as being caused by the scanner (e.g. by dust) by comparing, in block 99*c*, the profile of the rotated image and the profile of the not-rotated image: A streak is identified as being caused by the scanner if a peak in the not-rotated image is stronger, e.g. has a higher amplitude, than a peak at a corresponding spatial location in the rotated image. In some examples, (f) and (g) are performed by an image capturing streak detector, i.e. a detector for identifying image capturing streaks by performing (f) and (g).

The example method illustrated in FIG. 9 further includes identifying, in block 100, streaks as wiper streaks by: (h) Calculating, in block 100*a*, a (new) profile based on the vector calculated as described with regard to block 96 by calculating for each component of this vector a local spatial standard deviation. (i) Repeating locating peaks in the (new) profile in the same manner described with regard to block 97 and identifying streaks caused by the scanner in the same manner described with regard to block 99. Thereby, image capturing streaks may be separated out. In some examples, (h) and (i) are performed by a wiper streak detector, i.e. a detector for identifying wiper streaks by performing (h) through (i).

Particular streaks might be identified several times in response to repeating locating peaks in several scales as described before. Such unwanted artifacts may be reduced by merging, in block 101, close streaks by: (j) sorting the spatial location of the identified streaks and (k) merging adjacent streaks if a distance between them is smaller than a certain threshold.

Although certain methods and products have been described herein, the scope of coverage of this patent is not limited thereto. On the contrary, this patent covers all embodiments fairly falling within the scope of the appended claims either literally or under the doctrine of equivalents.

The invention claimed is:

1. A method for identifying a streak in an image, the method comprising:
    determining a cross-sectional pixel profile of an image;
    determining a peak in the cross-sectional pixel profile of the image;
    determining a strength of the peak in the cross-sectional pixel profile of the image;
    determining a rotation angle of the image;
    calculating a rotated image based on a rotation of the image by the rotation angle;
    determining a cross-sectional pixel profile of the rotated image;
    determining a peak in the cross-sectional pixel profile of the rotated image corresponding to the peak in the cross-sectional pixel profile of the image;
    determining a strength of the peak in the cross-sectional pixel profile of the rotated image; and
    identifying a streak in the image based on the strength of the peak in the cross-sectional pixel profile of the image and the strength of the peak in the cross-sectional pixel profile of the rotated image.

2. The method according to claim 1, wherein identifying the streak includes identifying the streak as an image capturing streak in response to the strength of the peak in the cross-sectional pixel profile of the rotated image being smaller than the strength of the peak in the cross-sectional pixel profile of the image.

3. The method according to claim 1, wherein identifying the streak includes identifying the streak as an image printing streak in response to the strength of the peak in the cross-sectional pixel profile of the rotated image being larger than the strength of the peak in the cross-sectional pixel profile of the image.

4. The method according to claim 1, wherein identifying the streak includes applying a local spatial standard deviation on the cross-sectional pixel profile of the rotated image to calculate a new pixel profile and identifying the streak as a wiper streak in response the strength of the peak in the new pixel profile being larger than the strength of the peak in the cross-sectional pixel profile of the image.

5. The method according to claim 1, further comprising capturing, by an image capture device, the image from a printout.

6. The method according to claim 5, further comprising printing the printout by a printing press.

7. The method according to claim 1, wherein the rotation angle is greater than 0° and less than 30°.

8. The method according to claim 1, wherein determining the rotation angle includes analyzing at least two fiducial marks included in the image.

9. The method according to claim 1, further comprising broadening streaks by applying a morphological filter to at least one of the image and the rotated image.

10. A printing press comprises an image capture device; wherein
the printing press includes at least one processor and a memory, and
the memory comprises executable instructions that when executed by the at least one processor cause the at least one processor to
generate, by the printing press, a printout;
cause the image capture device to capture an image of the printout;
determine a cross-sectional pixel profile of the image;
determine a peak in the cross-sectional pixel profile of the image;
determine a strength of the peak in the cross-sectional pixel profile of the image;
determine a rotation angle of the image;
calculate a rotated image by rotating the image according to the rotation angle;
determine a cross-sectional pixel profile of the rotated image;
determine a peak in the cross-sectional pixel profile of the rotated image corresponding to the peak in the cross-sectional pixel profile of the image;
determine a strength of the peak in the cross-sectional pixel profile of the rotated image; and
identify a streak in the image based on the strength of the peak in the cross-sectional pixel profile of the image and the strength of the peak in the cross-sectional pixel profile of the rotated image.

11. A non-transitory machine-readable storage medium encoded with instructions executable by a processor, the machine-readable storage medium comprising:
instructions to determine a rotation angle of an image;
instructions to calculate a rotated image by rotating the image according to the rotation angle;
instructions to determine a cross-sectional pixel profile of the rotated image;
instructions to determine a cross-sectional pixel profile of the image;
instructions to determine a peak in the cross-sectional pixel profile of the rotated image;
instructions to determine a strength of the peak in the cross-sectional pixel profile of the rotated image;
instructions to determine a peak in the cross-sectional pixel profile of the image, wherein the peak in the cross-sectional pixel profile of the image corresponds to the peak in the cross-sectional pixel profile of the rotated image;
instructions to determine a strength of the peak in the cross-sectional pixel profile of the image; and
instructions to identify a streak in the image based on the strength of the peak in the cross-sectional pixel profile of the image and the strength of the peak in the cross-sectional pixel profile of the rotated image.

12. The medium according to claim 11, wherein the instructions to identify the streak include instructions to identify the streak as an image capturing streak in response to the strength of the peak in the cross-sectional pixel profile of the rotated image being smaller than the strength of the peak in the cross-sectional pixel profile of the image.

13. The medium according to claim 11, wherein the instructions to identify the streak include instructions to identify the streak as an image printing streak in response to the strength of the peak in the cross-sectional pixel profile of the rotated image being larger than the strength of the peak in the cross-sectional pixel profile of the image.

* * * * *

UNITED STATES PATENT AND TRADEMARK OFFICE
CERTIFICATE OF CORRECTION

PATENT NO. : 10,346,967 B2
APPLICATION NO. : 15/569463
DATED : July 9, 2019
INVENTOR(S) : Liron Itan et al.

It is certified that error appears in the above-identified patent and that said Letters Patent is hereby corrected as shown below:

In sheet 6 of 9, reference numeral 70, Line 1, delete "the the" and insert -- the --, therefor.

In sheet 6 of 9, reference numeral 71, Line 1, delete "response" and insert -- response to --, therefor.

In Column 12, Line 62, Claim 4, delete "response" and insert -- response to --, therefor.

Signed and Sealed this
Seventh Day of January, 2020

Andrei Iancu
*Director of the United States Patent and Trademark Office*